United States Patent [19]
Parker et al.

[11] Patent Number: 5,202,677
[45] Date of Patent: Apr. 13, 1993

[54] DISPLAY APPARATUS USING THERMOCHROMIC MATERIAL

[75] Inventors: Robert Parker, Alamo; Stephen Phillips, Walnut Creek, both of Calif.

[73] Assignee: Crystal Images, Inc., Boca Raton, Fla.

[21] Appl. No.: 648,727

[22] Filed: Jan. 31, 1991

[51] Int. Cl.⁵ .............................. G09G 3/34
[52] U.S. Cl. ..................... 340/786; 359/44; 40/448
[58] Field of Search .............. 340/786, 754, 752, 716, 340/730; 359/43, 44, 83, 84, 76, 86; 40/448, 544, 427, 442, 542, 606, 572, 443

[56] References Cited

U.S. PATENT DOCUMENTS

| | | | |
|---|---|---|---|
| 4,142,782 | 3/1979 | O'Brian | 40/448 |
| 4,468,659 | 8/1984 | Ohba et al. | 340/760 |
| 4,827,253 | 5/1989 | Maltz | 340/703 |
| 4,893,903 | 1/1990 | Thakar et al. | 359/83 |
| 4,932,147 | 6/1990 | David | 359/43 |
| 5,058,999 | 10/1991 | Davis | 359/43 |

Primary Examiner—Jeffery A. Brier
Assistant Examiner—A. Au
Attorney, Agent, or Firm—Kinney & Lange

[57] ABSTRACT

A visual display dependent upon the use of thermochromic materials is formed as a thin structure on a substrate sheet with a vapor deposited conductive film heater applied thereto. The current is applied to the heater through parallel opposed buss bars so that the heater heats uniformly. A non-thermochromic image layer is mounted on the substrate, with one or more thermochromic image layers thereover. One thermochromic image layer covers a first portion of a visible display area of the substrate, while a second thermochromic layer covers a second portion of the visible display area, with the first and second portions overlapping slightly along contiguous edges thereof. As the display is heated and cooled, the thermochromic materials of the thermochromic image layers reach their respective transition temperatures to change state from opaque to colorless or vice-versa, or from one color to another. The visual display is mounted within an enclosure to protect the display from environmental interference and thereby insure the desired control of heating of the display, as well as cooling thereof.

23 Claims, 11 Drawing Sheets

| TEMP (°C) | VISIBILITY | | | |
|---|---|---|---|---|
| | Nonthermochromic Base Layer (ice cube picture) | Thermochromic Background Layer W/Negative Letters (ICE) | Thermochromic Positive Letters (ICE) | Liquid Crystal Letters (COLD) |
| 37 | NO | YES | YES | NO |
| 39-43 | NO | YES | YES | YES |
| 45 | YES- through cleared positive letters (ICE) | YES | NO | NO |
| 47 | YES | NO | NO | NO |

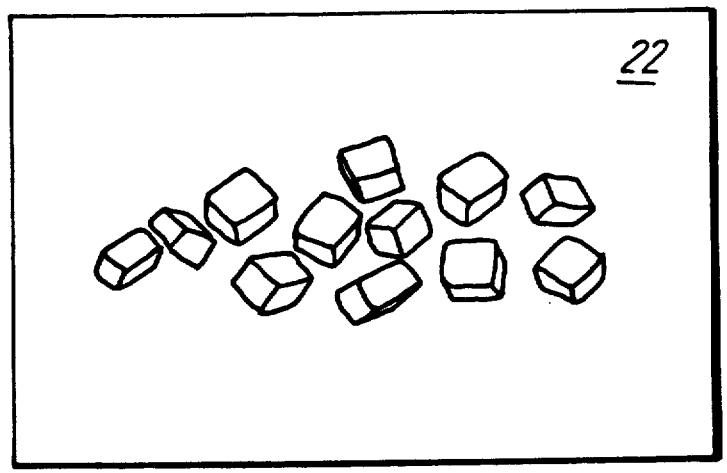
Fig. 8a
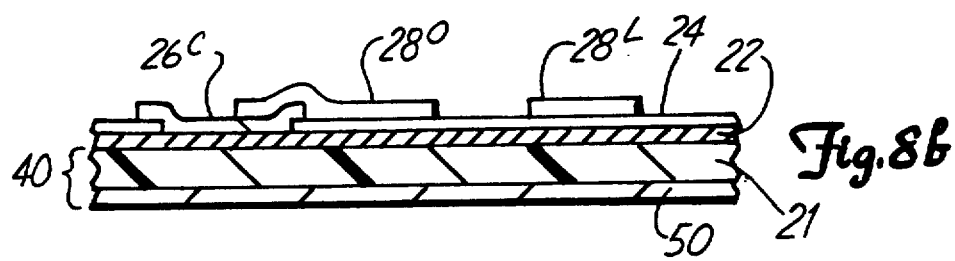
Fig. 8b
Fig. 9
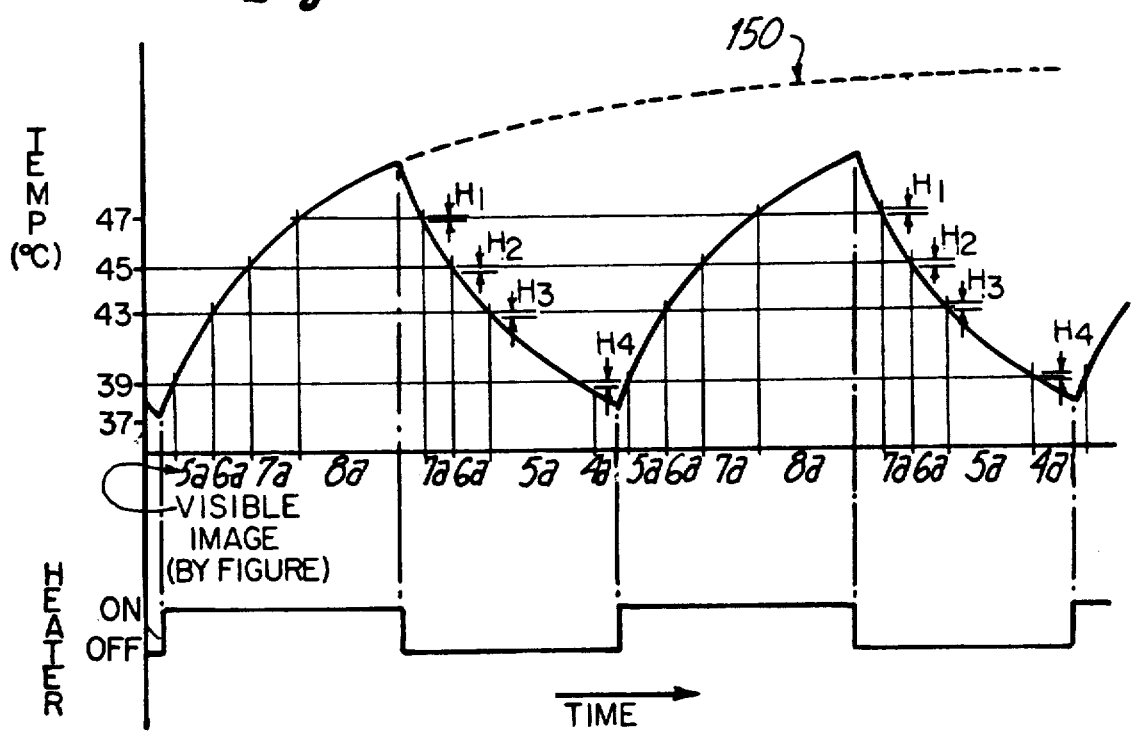

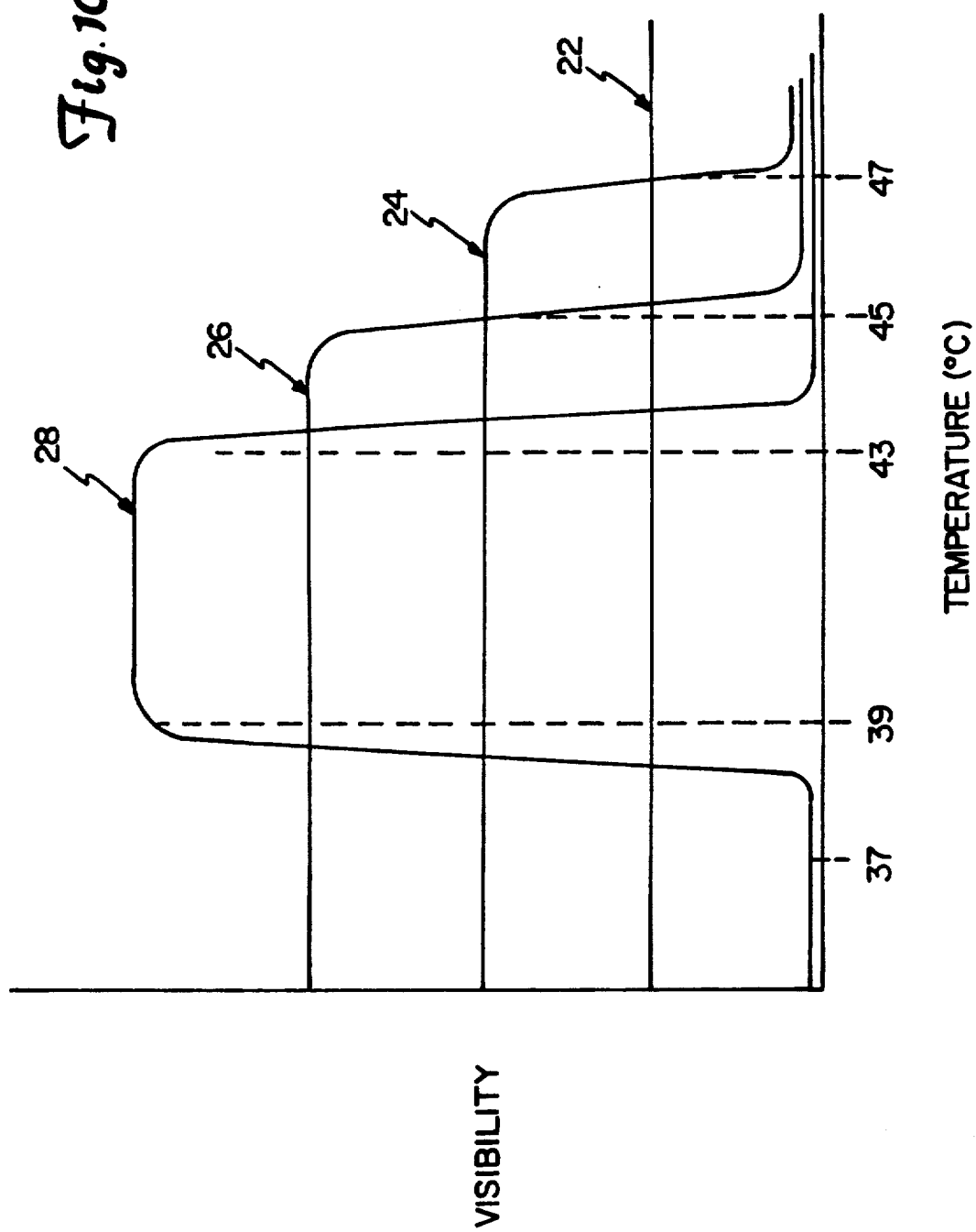

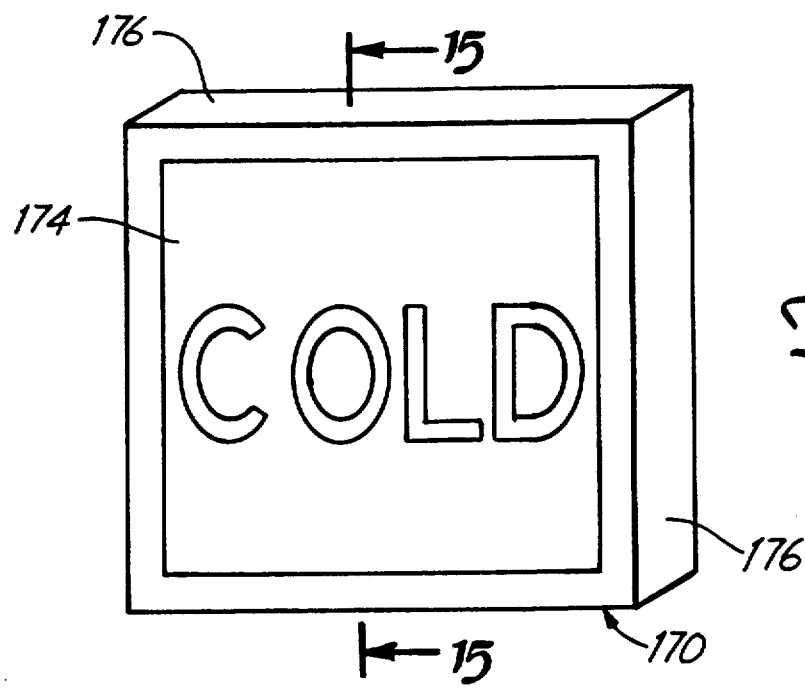
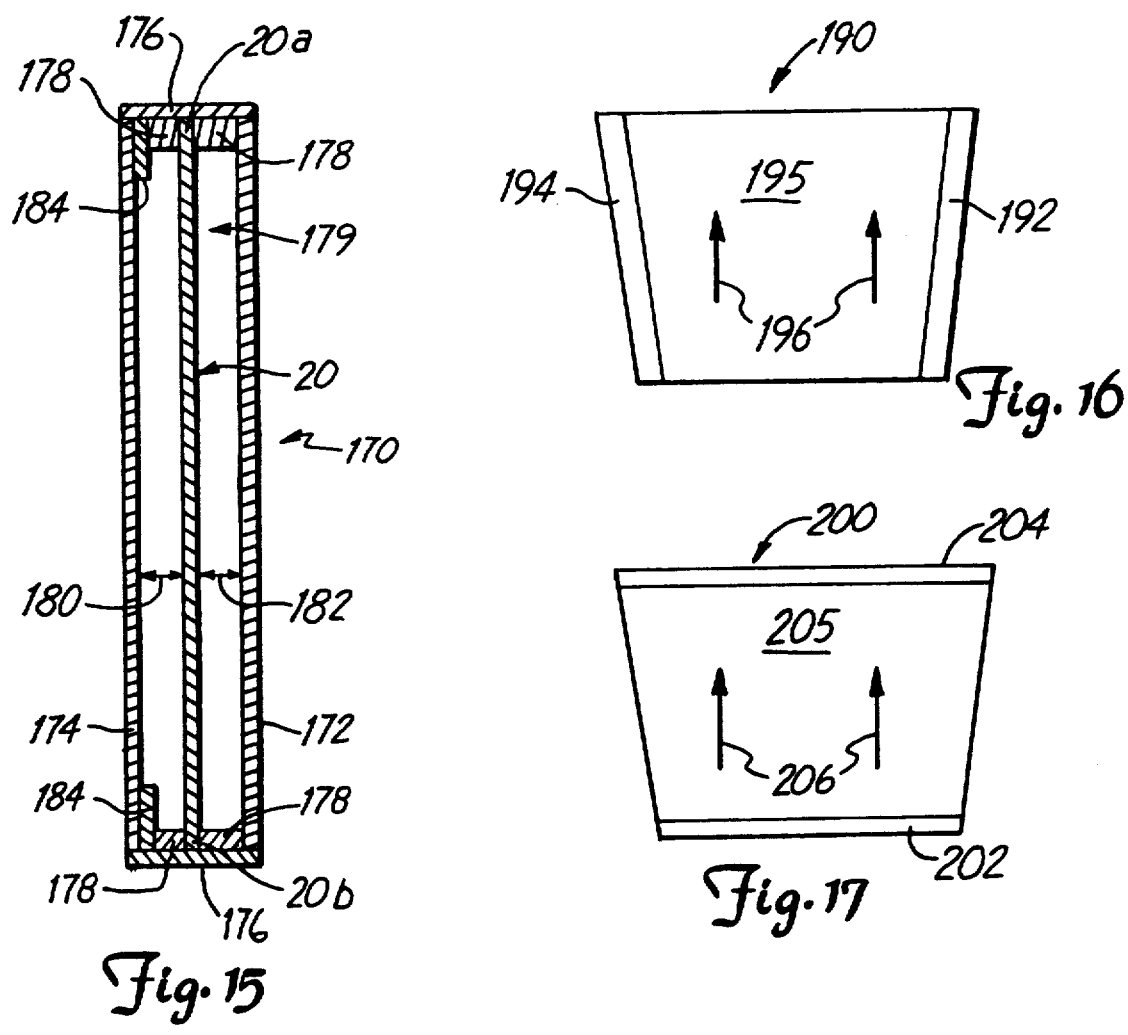

DISPLAY APPARATUS USING THERMOCHROMIC MATERIAL

BACKGROUND OF THE INVENTION

This invention relates to an image display apparatus, and specifically to an image display apparatus having one or more thermochromic images mounted on a heatable substrate so that the visible images on the substrate change as the temperature of the substrate is changed.

Signs and visual displays are often used to gain attention. Signs are used to warn of danger or to call attention (e.g., arrows or "PAY HERE"). In advertising, signs are used to draw attention to a product or store or special event. A typical sign is two-dimensional and contains no movement or changing features. Mechanically movable signs and images are known (e.g., changeable billboards), but are often very complex and require substantial extra space for the mechanical components, (e.g., motors, shutters, linkages, etc.). Other means to simulate or show motion or changing scenes in signs include varying the densities or colors of light on the sign, motion picture technologies (e.g., a backlit projector box) or video systems. Such arrangements are relatively expensive and require additional space in the signage for components necessary to achieve the desired and hopefully eye-catching display.

In many contexts, and particularly in the advertising context, space concerns are a premium. A point of purchase advertisement (advertising within a retail outlet directly to the consumer at the time of purchase) must compete with all other products and displays in the surrounding area for catching the consumer's eye and attention. Advertising space in this setting is extremely limited and often quite expensive. While the techniques mentioned above have been utilized to create active visual displays and signs, a more efficient and reliable arrangement is desired. In addition to being compact in its use of space, it is of course desirable that an active visual display be energy efficient and simple in operation, with very low maintenance concerns.

In Kito et al., U.S. Pat. No. 4,554,565, a method of producing a reversible thermochromic display is set forth. Kito et al., U.S. Pat. No. 4,554,565 is incorporated by reference herein. The Kito et al. patent is directed to method for producing a reversible thermochromic display composed of two or more overlapping layers of images formed on a support. At least one of the layers provides a reversible thermochromic image, and the colored images on the respective layers thus have different visual densities depending on the temperature of the support. The reversible thermochromic image layer changes color at a temperature lower or higher than a predetermined point and provides a color which is more intense and more easily discernable than the pale color of the other images. The Kito et al. patent fails to disclose any particular heater structure for heating the support on which the image layers are placed.

The Kito et al. patent advocates a thermochromic image layered approach to forming an active visual display. While the reversible thermochromic material has a light transmissive state and a non-light transmissive state, it does suffer from the problem of not clearing to full transparency in its light transmissive state. It clears to a slightly whitish milky state, not fully transparent. Accordingly, applying layers of thermochromic inks over one another builds up this non-transparency feature when the layers are successively cleared, which significantly impairs the clarity of any underlying images.

Reversible thermochromic materials are known (see, e.g., U.S. Pat. Nos. 4,028,118 and 4,720,301, incorporated by reference herein) and printing inks and paints prepared from such materials have been applied to various articles to construct temperature indicators, ornamental objects and toys that reversibly change or develop color at well defined temperatures. For example, Hippely et al., U.S. Pat. No. 4,917,643, shows a toy vehicle painted with a thermochromic material which changes color as the temperature of the vehicle is varied. Shibahashi et al., U.S. Pat. No. 4,920,991, sets forth a thermochromic artificial fingernail which is either formed from or coated with a quasi-reversible material which is changeable in color and responds to temperature changes (with very high hysteresis effects), and therefore exhibit various external visual appearances. This reference notes that the thermochromic material may be formed not only as a layer which changes in color equally over its entire surface, but as a layer having thermochromic patterns so that the change of color is attained with some variety. It is suggested in Shibahashi et al. that the thermochromic material be formed as a layer having a plurality of thermochromic areas, which differ from one another in thermochromic response to temperature, and that such areas may be formed side-by-side to form patterns and may even include non-thermochromic areas. Shimizu et al., U.S. Pat. No. 4,560,604, discloses a method of flocking a shaped material with a thermochromic type material, wherein the shaped material can be used for making stuffed dolls, toy animals, etc. for infants to enjoy the color change in a bath. Reversible thermochromic materials have also been used for hidden messages on coffee cups, where the message appears on the side of the cup when the cup is filled with a hot liquid (or alternatively, with a cold liquid). The color conversion properties of these thermochromic materials may be generally linear such as the "Regular" type thermochromics available from Matsui International Co., Inc., of El Segundo, Calif., or non-linear such as the "History" type thermochromics available from Matsui International Co., Inc.

Another thermochromic material is a cholesteric liquid crystal, which is a "reversible" thermochromic that has a defined temperature range where the liquid crystal is optically active and scatters light in the visible range. The use of electrically activated liquid crystals in displays is found on the familiar numerical displays of watches and pocket calculators. Chiral nematic color changing liquid crystals are used in digital thermometers. These thermally activated liquid crystal materials are also used in battery testers and other temperature indicators, as well as various novelty products.

A further reversible thermochromic material is commonly referred to as "mercury salt". This material also has the characteristics of changing from one color to another (e.g., red to black) in response to changes in temperature, and the original color of this type of thermochromic material is restored by reversing the temperature change, with little hysteresis.

With respect to active sign-type displays using thermochromic materials, Three Tec Davis, Inc., of Tokyo, Japan, has made a display using a printed carbon heater with printed silver buss bars on a Mylar or thin di-electric film to provide a heat source using Joulean heating.

A non-thermochromic silk-screened color message is placed on the film and covered by a high-temperature black thermochromic "shutter" which clears at high temperature to reveal the message thereunder. Placed on top of this high-temperature thermochromic black "shutter" are two liquid crystal messages. The liquid crystal messages are activated at two different temperature ranges, both which fall below the thermochromic activation temperature and above normal room temperature. In operation, it is understood that as this device is heated by an application of current to the silver buss bars, the initial liquid crystal material changes through the liquid crystal color spectrum from clear to reveal a first message. On further heating, this liquid crystal color message disappears and the next liquid crystal message appears. On further continued heating, the second liquid crystal message disappears and the black thermochromic layer then clears and becomes "transparent", revealing the silk-screened underlying message. Upon cooling the device, these messages appear in a reverse sequence. Continuous cycling of this device causes the messages to repeat forward and reverse for each temperature cycle.

This display device has several significant drawbacks. The heater used for this device is based upon a generally thick film (0.25 to 0.50 mil) printed carbon loaded ink heater. This printed carbon heater does not provide a suitable heater for a thermochromic display system, since the temperature across its surface is not sufficiently uniform. A printed carbon heater is formed from a polymeric binder with flakes of carbon therein, and this polymeric based ink changes resistance with time, curing and humidity during the printing process. It is very difficult to obtain a fixed uniform desired resistance value across the heater. In addition, the use of silver buss bars printed on at least two edges of this heater makes the formation of a heater an expensive process and generally requires a high-temperature cure. The liquid crystal messages, while colorful, only refract or scatter 13 to 15 percent of the ambient light and hence, are not very bright. Furthermore, passive clear spacer or barrier layers between liquid crystal messages are used to prevent contamination and add further complexity and cost to the overall device.

There is thus no known thermochromic based visual display system which provides a display with high clarity at all temperatures, fast operating times and uniform image transitions for all images of the display. In addition, there is no known display system which provides a simple, relatively inexpensive and highly efficient (both in energy usage and in visibility) thermochromic display system. Because such display systems operate on the basis of heating the display, a suitable, highly repeatable and uniform heater is necessary. In addition, it may be desirable for such a display to be suitably sheltered from ambient environmental conditions, so that changes in the ambient environment do not alter the operation or diminish the desired effect of the thermochromic based-display system.

SUMMARY OF THE INVENTION

The present invention provides a visual display apparatus which includes sheet means having a first side and a second side for supporting a vapor deposited heater element on one side thereof. A first image layer is placed on one of the sides of the sheet means, with the first image layer being formed from a non-thermochromic material. A second image layer is mounted over the first image layer on the sheet means, with the second image layer being formed from a thermochromic material that changes, as a result of a temperature change, from a first wavelength transmission state to a second wavelength transmission state.

The sheet means is defined as a dielectric sheet with the vapor deposited heater element thereon formed by a thin uniform film of conductive material on the first side, wherein the thin film of conductive material heats in response to the application of an electrical current thereto. A pair of opposed buss bars of highly conductive material are spaced apart on the thin film of conductive material to uniformly distribute an electrical current to the vapor deposited heater element therebetween. The buss bars are also vapor deposited on the film of conductive material. The display apparatus thus involves a thin film Joulean heater, and in one embodiment, is provided with means for defining desired thermal insulation and heat paths and heat sinks so that a uniform temperature profile is maintained as the thermochromic material is heated and cooled.

In another embodiment, the visual display apparatus of the present invention includes a substrate having a visible display area with means for controlling the temperature of the visible display area of the substrate. A first thermochromic material covers a first portion of the visible display area, with the first thermochromic material changing, as a result of a first temperature change, from a first wavelength transmission state to a second wavelength transmission state. A second thermochromic material covers a second portion of the visible display area, with the second thermochromic material changing, as a result of a second temperature change, from a first wavelength transmission state to a second wavelength transmission state. The first and second thermochromic materials combine to form a substantially single layer on the substrate with the first and second thermochromic materials overlapping slightly along contiguous edges thereof.

Accordingly, a positive/negative imaging arrangement of thermochromic materials is possible. For example, the first portion defines a positive representation of a desired display image, while the second portion defines a negative representation of the same desired display image, or vice-versa.

The present invention thus presents a visual display apparatus which employs a very thin vapor deposited heater element mounted on a sheet with the thermochromic materials applied thereto. It is highly efficient in its use of the relatively expensive thermochromic materials and provides a vapor deposited heater element structure which is reliable, inexpensive and efficient. The features of the present invention are discussed in more detail below, and it is not intended that the summary presented hereinabove should in any way limit the nature or scope of the invention disclosed and claimed herein.

BRIEF DESCRIPTION OF THE DRAWINGS

The invention is further described with reference to the accompanying drawings, where like numbers refer to like parts in several views.

FIGS. 4a, 4b, 5a, 5b, 6a, 6b, 7a, 7b, 8a and 8b illustrate the stages of optical development of the visual display of FIG. 1, as the temperature of the display is raised. Each pair of figures (e.g., FIGS. 4a and 4b, FIGS. 5a and 5b, etc.) illustrates a plan view of the display and a partial cross-sectional view therethrough at a particular stage, respectively.

FIG. 9 is a graphic representation of (1) the temperature change and (2) the heater activation, both over time, for a visual display of the present invention.

FIG. 10a is a graphic representation showing the visibility of the image layers, corresponding to the truth table of FIG. 10.

FIG. 14 is a perspective view of an enclosure for the image bearing sheet of a visual display of the present invention.

FIG. 15 is a cross-sectional view as taken along lines 15—15 in FIG. 14.

FIGS. 16 and 17 illustrate alternative arrangements for buss bar application on the heater of the present invention.

These drawing figures are provided for illustrative purposes only and are not drawn to scale, nor should they be construed to limit the intended scope and purpose of the present invention.

DETAILED DESCRIPTION OF THE PREFERRED EMBODIMENTS

Figure 1:
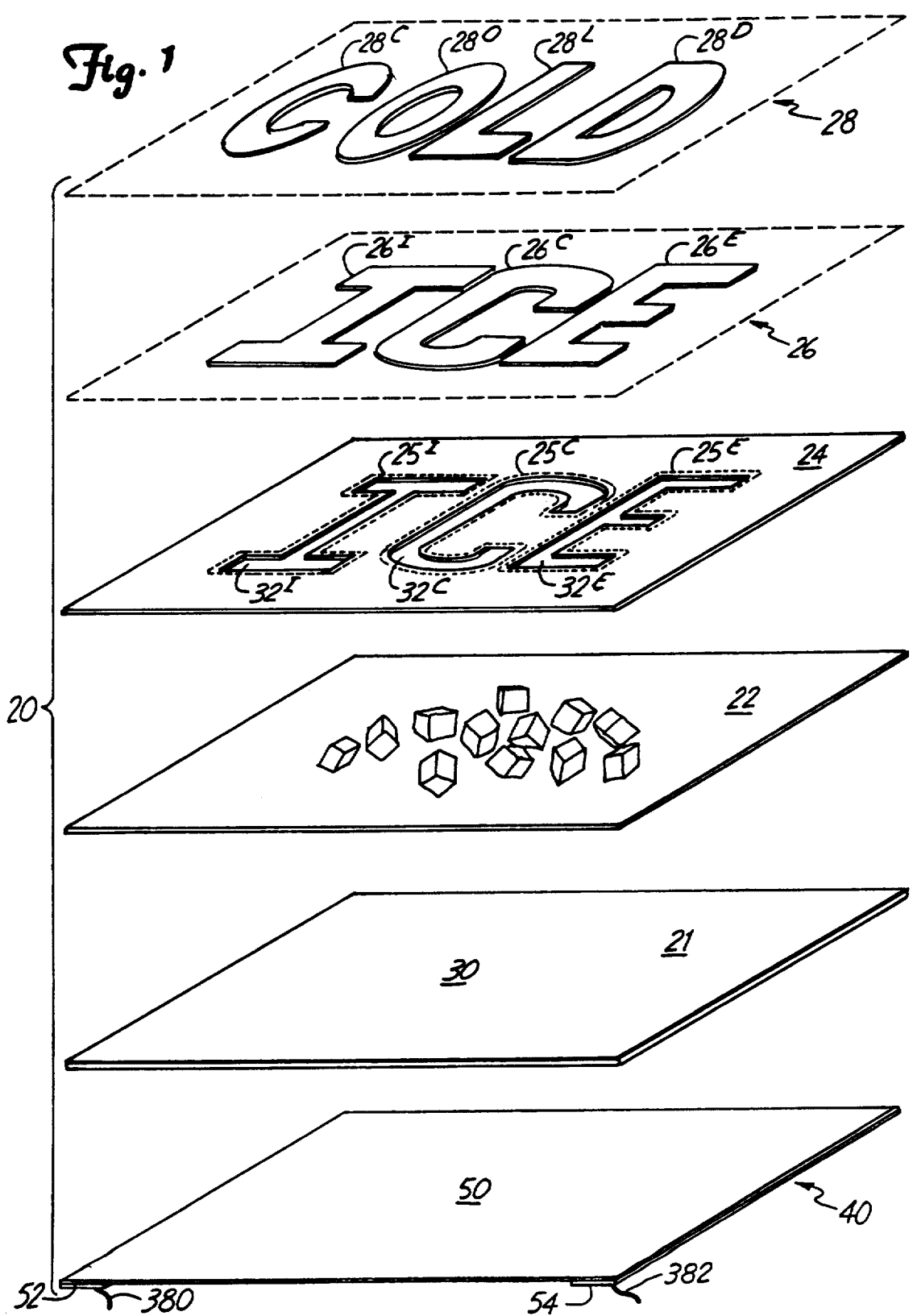
FIG. 1 is an exploded perspective view illustrating the layered components of a visual display of the present invention.
Figure 2:
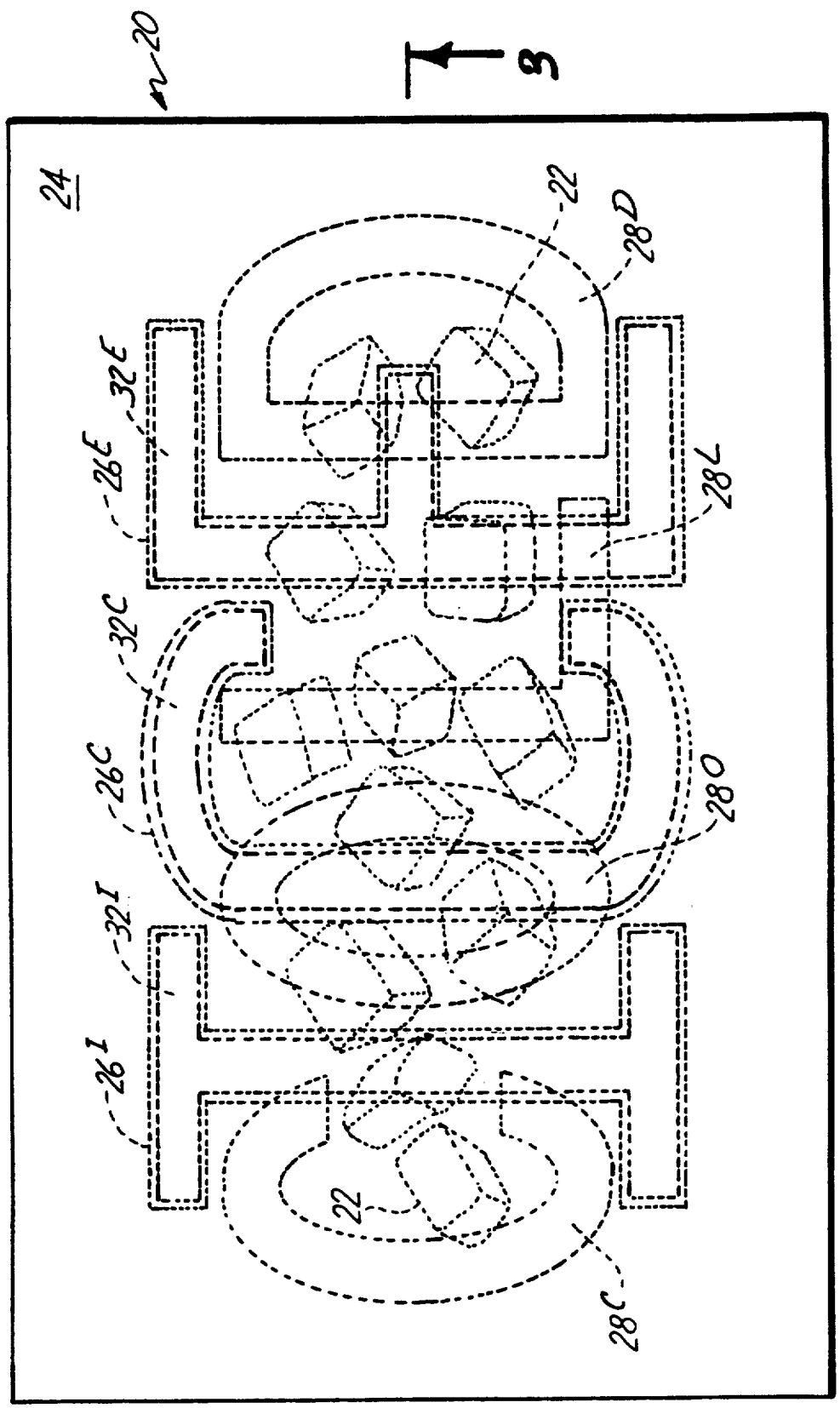
FIG. 2 is a plan view of the visible display area of the display at ambient temperature, illustrating the overlapping image layers in phantom.
Figures 3, 10:
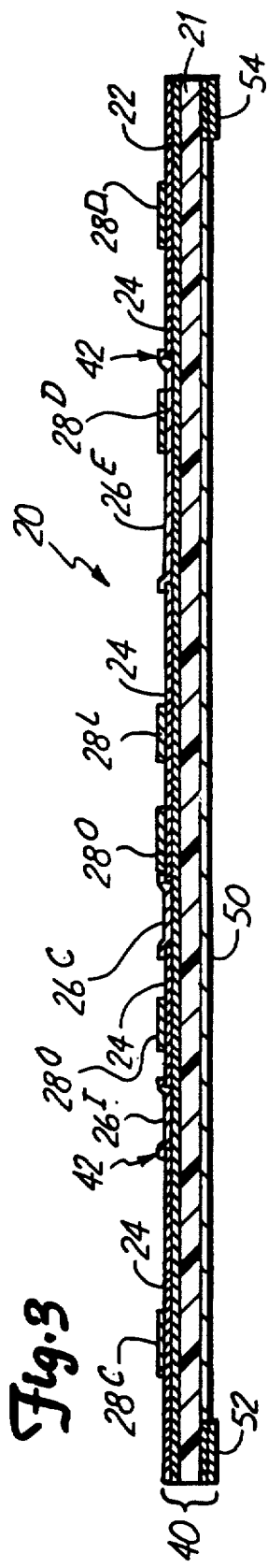
FIG. 3 is a cross-sectional view as taken on lines 3—3 in FIG. 2.
FIG. 10 is a truth table illustrating the visibility of the image layers of the present invention relative to temperature.

A visual display 20 is provided with a plurality of image layers for effecting a two-dimensional, changeable image, and is illustrated in FIGS. 1-3. The major components of the display 20 are referenced in the FIGS. herein as follows: reference numeral 21 represents a supporting substrate; 22 a non-thermochromic image layer on the substrate; 24 an image layer of thermochromic material over the layer 22; 26 another image layer of thermochromic material in registration with layer 24 (and over layer 22); and 28 an image layer of thermally activated material over the layers 22, 24 and 26. The substrate 21 has a first side and a second side, with a visible display area 30 on the first side thereof which is adapted to support the image layers 22, 24, 26 and 28.

As illustrated in FIG. 1, non-thermochromic image layer 22 depicts an image which can be a standard ink printed picture or photograph (e.g., ice cubes, words, letters, or some combination of visible components which are used to provide a message to the viewer), and which can be any color or combination thereof. By "non-thermochromic" it is meant that this image layer is not affected by changes in the temperature of the substrate 21 or layer 22 within an operating temperature range for the display 20.

The thermochromic image layers 24 and 26 are formed from materials which are responsive to temperature to alter their light transmissiveness. At a desired temperature (such as ambient room temperature—e.g., 20° C.), the layers 24 and 26 assume the same color or visual density (preferably a dark or black appearance) and are non-light transmissive. As illustrated in FIG. 1, the thermochromic image layer 24 is the first layer on top of non-thermochromic image layer 22 and has an image formed therein in negative or reverse form. In other words, image layer 24 provides a background cover for the visible display area 30 of the substrate 21, except for the negative rendering of a desired image such as the word "ICE".

The thermochromic image layer 26 provides a second thermochromic image layer which is in the shape only of the desired image—in the case of FIG. 1, a positive rendering of the word "ICE". The image layers 24 and 26 are laid in registry over one another so that the negative letters I-C-E on the first thermochromic image layer 24 and the positive letters I-C-E on the second thermochromic image layer 26 form a thermochromic composite layer which completely overlies over the non-thermochromic image layer 22 on the visible display area 30 of the substrate 21. In essence, the visible display area has a first portion thereof (everything but the letters I-C-E) covered by the first image layer and a second portion thereof (the letters I-C-E) covered by the second image layer. The two image layers thus combine to form a substantially single layer on the substrate. The utility of this particular arrangement is discussed in greater detail below.

As further shown in FIG. another image layer 28 is positioned over at least selected portions of the thermochromic image layers 24 and 26, with image layer 28 formed from a layer of thermochromic material which becomes optically active over the visible range only within a desired temperature range. Those characteristics are satisfied by forming the third image layer 28 of a liquid crystal material. In the example visual display 20 of FIG. 1, the third image layer 28 is a positive rendering of the word "COLD".

FIG. 2 illustrates (in phantom) the images of the respective image layers 22, 24, 26, and 28 as superimposed over one another on the substrate 21. FIG. 3 illustrates a sectional view taken through the visual display 20. In FIGS. 1-3, superscripts are applied to the reference numerals for the respective image layers 28 and 26 to illustrate the positive letters of the words "COLD" (for layer 28) and "ICE" (for layer 26). In addition, the reverse letters "ICE" of image layer 24 are denoted as image openings 32 therethrough, with the respective superscript of the letters for the word "ICE" applied for each letter opening.

Before proceeding with a discussion of the present invention structure and operation, it is necessary to briefly outline the nature of the thermochromic materials contemplated for use in the present invention. As used herein, "thermochromic" or "thermochromic material" means a material which is responsive to a change in temperature to alter its ability to transmit, absorb or reflect (scatter) light. Such a thermochromic material thus has a first wavelength transmission state wherein light wavelengths are transmitted therethrough, absorbed thereby or reflected therefrom in a particular manner (e.g., the material appears black). As the temperature of the thermochromic material is raised past a particular temperature, the material assumes a second wavelength transmission state wherein light wavelengths are transmitted therethrough, absorbed thereby or reflected therefrom in a different manner (e.g., the material now appears colorless). This change in state (light wavelength transmissibility) is reversible by again lowering the temperature of the thermochromic material. There are several types of thermochromic materials.

Reversible thermochromic materials that change their light wavelength transmissiveness at a particular temperature are known, and are commercially available in a micro-encapsulated ink or dye form. These materials consist of a combination of a micro-encapsulated color-based pigment (e.g., color particles) and a transparent carrier. Reversible thermochromics change color or transparency as different temperatures are applied to a surface coated with such materials. Each material has a "built in" temperature that predetermines at what temperature it will change from its original opaque color state to a colorless state (nearly transparent). Reversible thermochromic inks are available from a variety of sources including Matsui Shikiso Chemical Co., Ltd., of Kyoto, Japan ("Chromicolour" UV screen ink), Pilot Inc. Co., Ltd., of Aichi, Japan ("Metamo" ink), and Three Tec Davis, Inc., of Tokyo, Japan, among others. Preferably, a thermochromic ink as used herein is ultraviolet (UV) curable. This type of ink provides a sharper image, since there are no solvents in the ink and the curing process requires no evaporation. Such inks can be applied by conventional printing techniques, although silk-screen printing techniques are presently believed to provide the most effective means for printing to achieve the desired effects of the present invention.

As mentioned above, reversible thermochromics are available with linear color change characteristics (e.g., the color change upon heating or cooling the material occurs at the same transition temperature) or with non-linear color change characteristics. In a non-linear thermochromic, hysteresis causes the change in light transmission of the thermochromic material to occur at a different temperature, depending on whether the temperature of the thermochromic material is being raised or lowered. For example, as the temperature of the thermochromic material is raised past a particular temperature $T_1$, the wavelength transmission of the material is altered from a first state to a second state. However, when the thermochromic material is cooled to reverse this change in state, no change in light transmission occurs as the temperature of the material returns to temperature $T_1$, but rather at a lower temperature $T_2$. Reheating of the thermochromic material results in the light transmission change again occurring at temperature $T_1$ and so on. In the display apparatus of the present invention, little or no hysteresis is preferred.

Another type of reversible thermochromic material is colorless (essentially transparent) except when in a specific temperature range, at which time it becomes visible. Thermochromic liquid crystal materials have this characteristic are commercially available from several companies, such as Hallcrest of Glenview, Ill. Hallcrest has developed a silk-screenable liquid crystal material which is called a microencapsulated chiral nematic and which has quite vivid colors. Since a liquid crystal scatters light, it thus requires a generally dark background to be most visible. It changes through its liquid crystal visible color spectrum of clear to red to green to blue to purple to clear (as heated) or the reverse color sequence (when cooled). At a temperature below its designed temperature range, the liquid crystal material is essentially transparent. Similarly, at a temperature above its designed temperature range, the liquid crystal material is also essentially transparent. Therefore, the liquid crystal material is only visible when at a temperature within the designed temperature range.

In addition to these materials, there are other reversible thermochromic materials which may be employed in the present invention, including such materials as mercury salts and thermochromic index mismatching materials.

In order to manipulate the temperature of the substrate 21 and the thermochromic image layers thereon, a heater structure 40 is provided and suitably controlled to operate through the temperature ranges which are necessary to activate the thermochromic image layers of the visual display 20. The heater structure 40 is illustrated in FIGS. 1, 3 and 4b, and its operation is described in greater detail below.

FIGS. 4a to 8b illustrate the cycling of the visual display 20 illustrated in FIGS. 1-3. In this example of a visual display of the present invention, the transition temperature (that temperature where the reversible thermochromic material changes from a non-light transmissive state to a light transmissive state as heated) for the reversible thermochromic image layer 24 is 47° C., the transition temperature for the reversible thermochromic image layer 26 is 45° C., and the desired temperature range for the liquid crystal image layer 28 is 39°-43° C. When the liquid crystal image layer 28 is heated to a temperature in this range, the liquid crystal material is visible.

FIGS. 9, 10 and 10a also graphically illustrate the effects of temperature changes on the visual display 20 depicted in FIGS. 1-8. FIG. 9 is a chart illustrating temperature activity over time, while FIG. 10 is a truth table illustrating the visibility of a particular image layer (or part thereof) as a function of temperature. FIG. 9 also illustrates the relationship of the temperature-time curve to the timing of heater activation. FIG. 10a is a graphic depiction of the information set forth in the truth table of FIG. 10, plotting the visibility of the image layers as a function of temperature.

Figure 4A:
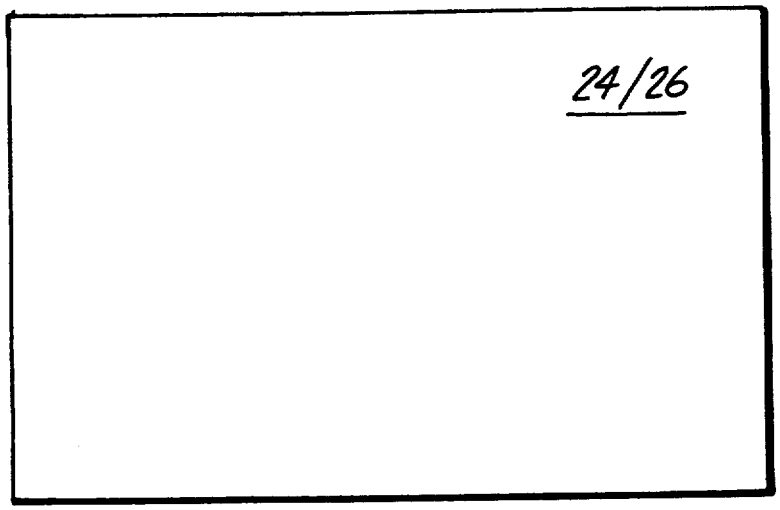
Figure 4B:
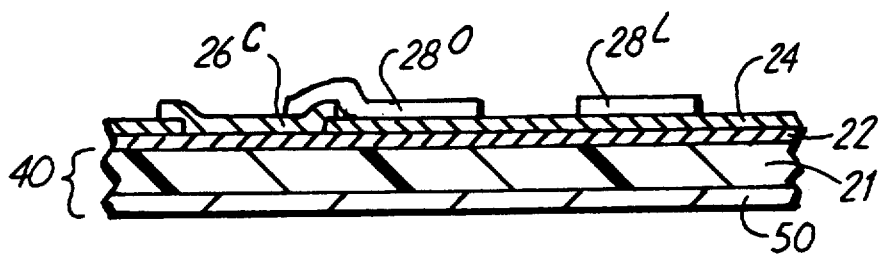

Turning to FIGS. 4a and 4b, the visual display 20 is illustrated at an initial operating temperature of, for example, 37° C. This is below the active temperature range for the thermally activated liquid crystal image layer 28, so the liquid crystal layer is essentially transparent. This is also below the transition temperatures for the thermochromic image layers 24 and 26, so those layers are non-light transmissive and thus constitute the visible image portrayed by the visual display 20. Preferably, the layers 24 and 26 present the same color (e.g., black) at this temperature, so the display 20 looks like a blank, single color display (see FIG. 4a). In FIG. 4b, the "transparency" of the liquid crystal image layer 28 is illustrated by showing that layer without section lines.

Figure 5A:
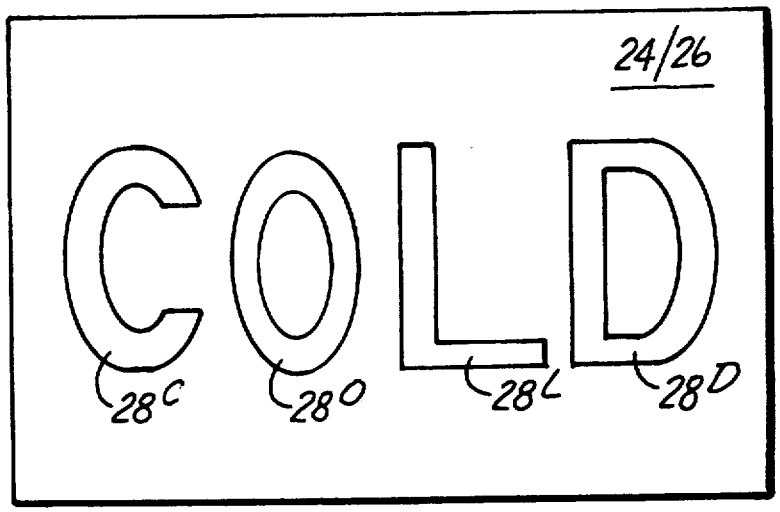
Figure 5B:
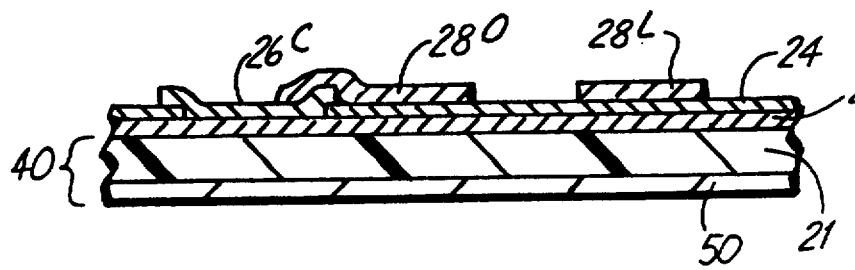
Figure 6A:
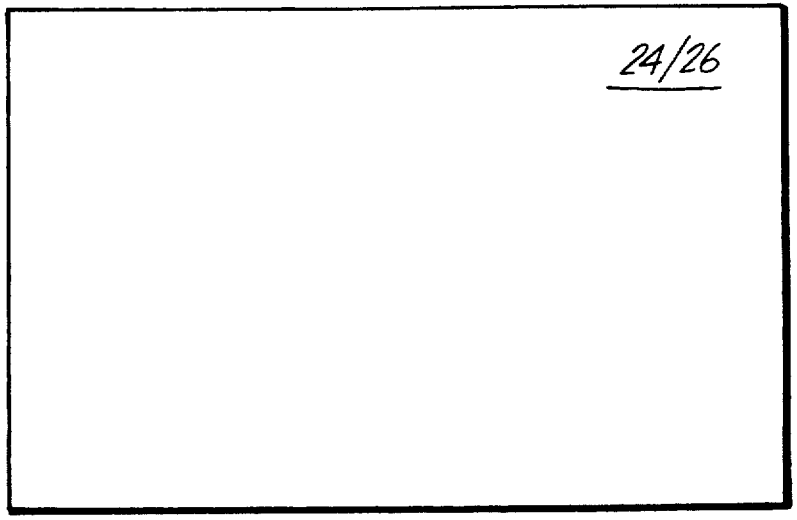
Figure 6B:
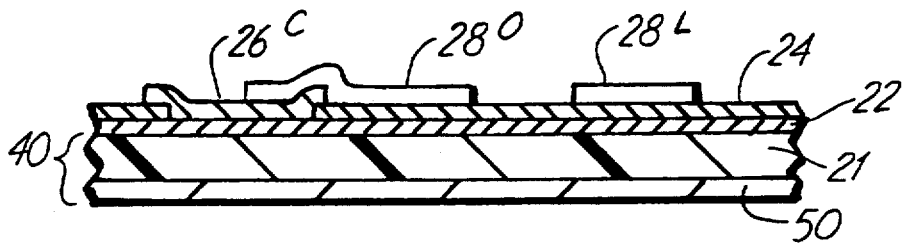
Figure 7A:
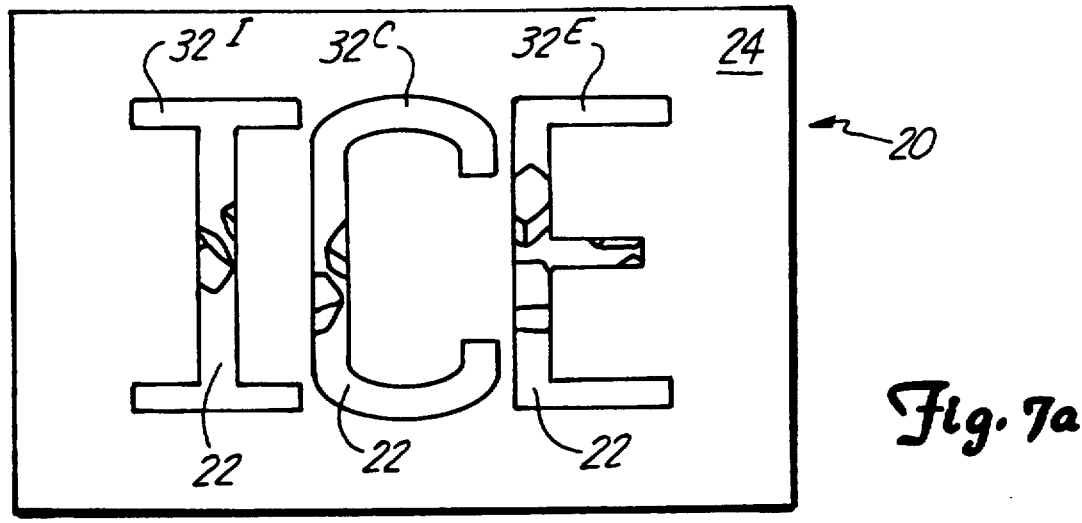
Figure 7B:
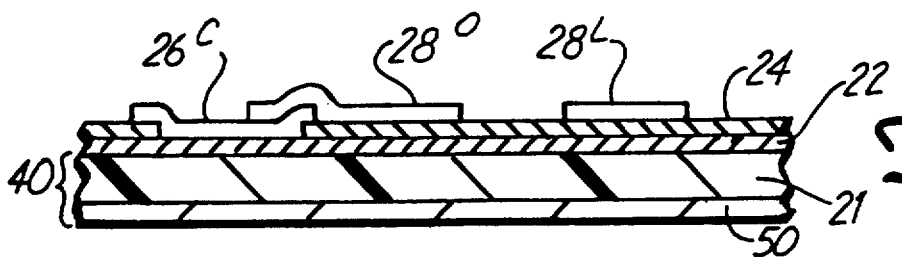

As the visual display 20 is heated and its temperature rises, it reaches the desired temperature range 39°-43° C. for the liquid crystal layer 28, and the liquid crystal layer image appears, as seen in FIG. 5a. As the temperature increases and passes through this range, layer 28 appears red, then green, then blue, then purple. FIG. 5b now shows the thermally activated layer 28 with section lines to indicate its visibility. As the visual display 20 is further heated, the temperature rises above the temperature range and the thermally activated image layer 28 thus again becomes "transparent". A viewer of the display 20 thus sees a blank, single color display similar to FIG. 4a (as seen in FIG. 6a). Again, as viewed in FIG. 6b, the transparent nature of the liquid crystal layer 28 is illustrated by showing that layer without section lines. As the temperature of the display 20 continues to rise, the transition temperature 45° C. of the thermochromic image layer 26 is reached, and the thermochromic image layer 26 changes from a non-light transmissive state to light transmissive state, thereby becoming colorless and nearly transparent. In doing so, that portion of the visible display 20 covered by the thermochromic image layer 26 clears to permit a viewing of the underlying non-thermochromic image layer 22 thereunder. In the illustration, the thermochromic image layer 26 is formed from the letters I-C-E and thus the word "ICE" appears on the display 20, as seen in FIG. 7a. The image on layer 22 is of a contrasting color from the opaque, non-light transmissive color of layer 24 (which has not yet cleared), so the negative image (openings 32) in layer 24 is now visible. In FIG. 7b, the colorless nature of the thermochromic image layer 26 is illustrated by showing that layer without section lines.

As the visual display 20 is further heated, it reaches the transition temperature 47° C. of the thermochromic image layer 24. The thermochromic image layer 24 then changes from a non-light transmissive state to a light transmissive state which renders it colorless or generally transparent so that the image of the non-thermochromic layer 22 thereunder is visible, as seen in FIG. 8a. In FIG. 8b, the transparent nature of the thermochromic layers 24 and 26 and the liquid crystal layer 28 are illustrated by showing those layers without section lines.

At this time (once all thermochromic image layers are cleared) or shortly thereafter, the heater is turned off to allow the visual display 20 to cool down and reverse the active imaging cycle described above. The typical cycling of the visual display 20 in this manner is illustrated in FIG. 9. As the temperature of the heater rises, the image display 20 cycles through the visible images of FIGS. 4a, 5a, 6a, 7a, and 8a, and as the display 20 cools, it cycles back through the visible images of FIGS. 8a, 7a, 6a, 5a, and 4a in reverse sequence. As the heater is switched on and off continually, this image cycling repeats. Even with thermochromic materials that have linear state change characteristics, there may be a slight hysteresis lag in reaching the transition temperatures of the thermochromic materials upon cooling, as indicated by the hysteresis gaps $H_1$, $H_2$, $H_3$ and $H_4$ in FIG. 9. Accordingly, the activation temperatures of the thermochromic materials must be sufficiently spaced apart (e.g., by 2°-3° C.) to accommodate the lagging hysteresis effect noted in FIG. 9. If not so spaced, the active images may run together in transition (which in some applications may be desired). In the present invention, however, the smallest possible hysteresis effect is preferred, so that on cooling, the display will rapidly return to its initial state. A large hysteresis would result in an impracticable or unworkable display because of the required cycle time, temperature range and the necessity for subcooling the display to return it to its original state.

As noted above, the thermochromic image layer 24 and thermochromic image layer 26 bear complementary positive/negative representations of a common image. While in FIGS. 1-8 this image is represented by the word "ICE" it could be any image such as a drawing, arrow, corporate trademark or logo, etc. Therefore, as opposed to an arrangement where the entire visible display area is covered by a single thermochromic image layer, the use of a positive/negative relationship with two thermochromic materials which clear at different temperatures (and which are aligned in registration as illustrated in FIGS. 1 and 2), permits an intermediate message or image to be illustrated as the temperature of the display is changed (in this case, the word "ICE").

The thermochromic layers are printed (such as by silk-screening or gravure printing) onto the non-thermochromic layer 22. As may be appreciated, the printing of a positive/negative pair of layers creates printing registration concerns. To accommodate that concern, the contiguous edges of thermochromic image layers 24 and 26 are overlapped slightly (no more than 0.020 inch of overlap is necessary). This overlap is illustrated by the dotted lines $25^I$, $25^C$ and $25^E$ on image layer 24 in FIG. 1, and also by a comparative view in FIG. 3 of the letters I-C-E as represented by reference numerals $26^I$ and $32^I$, $26^C$ and $32^C$, and $26^E$ and $32^E$. In other words, the positive letters of image layer 26 are slightly larger than the negative letters (openings 32) of image layer 24. This overlapping arrangement is also illustrated in FIG. 3, as at 42. The thermochromics thus combine to form a substantially single layer on the substrate with the materials overlapping slightly along contiguous edges thereof.

By using side-by-side layers of thermochromic material as opposed to overlying layers of such material, the image quality of the underlying non-thermochromic layer is not hindered by the fact that the thermochromic materials do not clear to a completely transparent state. When multiple thermochromic layers are used in a visual display system, the "milkiness" of the overlying layers builds up and impairs the visibility of the underlying image when the thermochromic layers are rendered colorless. In addition, reversible thermochromic materials inks are relatively expensive. The present invention accommodates this cost factor by using no more thermochromic ink than necessary, and not unnecessarily overlying expensive ink with additional expensive ink.

Figure 11:
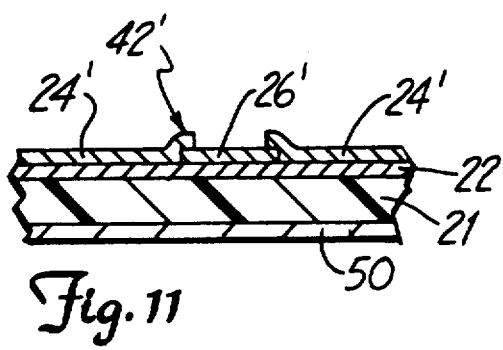
FIG. 11 is a partial cross-sectional view of a visual display of the present invention, illustrating an alternative sequence for applying the thermochromic materials.

It is not necessary that the first thermochromic image layer applied over the non-thermochromic layer bear the "negative" representation of the desired image. For example, the thermochromic image layers 24 and 26 can be reversed in position. FIG. 11 illustrates this relationship, where the desired image (e.g., a positive letter 26') is first printed on the non-thermochromic layer 22 with the background image of a negative letter (negative letter layer 24) printed later. The two image depictions slightly overlap along their contiguous edges, as at 42'. While the order of printing has been reversed, the temperature activation sequence remains the same so that as the display of FIG. 11 is heated, the thermochromic layer 26' changes to a light transmissive state before the thermochromic layer 24'. Thus, the visual effect achieved is the same, and the reversing may be done merely for ease of registration of the ink layers.

Figure 12:
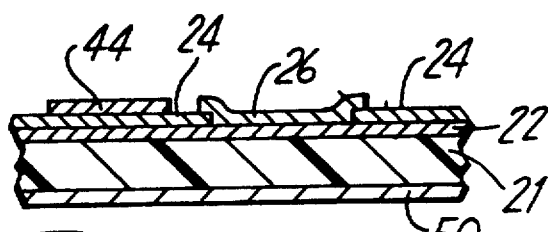
FIG. 12 is a partial cross-sectional view of an alternative embodiment of the visual display of the present invention.

In some applications, it may be desirable to permit the continuous display of a particular image (e.g., a company name or logo) during the entire heating cycle of the thermally active display apparatus 20. This may be accomplished by printing that image on the non-thermochromic layer 22 and then leaving a registered opening in any thermochromic layers placed thereover, so that there is no thermochromic material covering the image. A simpler arrangement for achieving this end, however, is seen in FIG. 12, wherein a non-thermochromic image is printed or placed atop one or more of the temperature activated image layers of the display. A non-thermochromic image layer 44 is shown printed over the thermochromic image layer 24. Accordingly, even though the thermochromic image layer 24 will change to a light transmissive state at a particular temperature, the non-thermochromic image of layer 44 is always visible to a viewer of the display. In this regard, the thermally activated display apparatus of the present invention may form just a portion of a larger display (e.g., a billboard) which otherwise is formed from non-thermochromic materials.

It is also possible to provide a third thermochromic image layer which is activated at yet another transition temperature from the first and second thermochromic image layers. This arrangement can then provide a sequential message or additional images as the display is cycled through its heating cycle, by clearing different portions of the visible display area of the underlying non-thermochromic image at different temperatures (and hence, at different times). FIGS. 13a, 13b, 13c and 13d illustrate the sequence of a sample display 120 employing three thermochromic image layers over a non-thermochromic image.

Figure 13A:
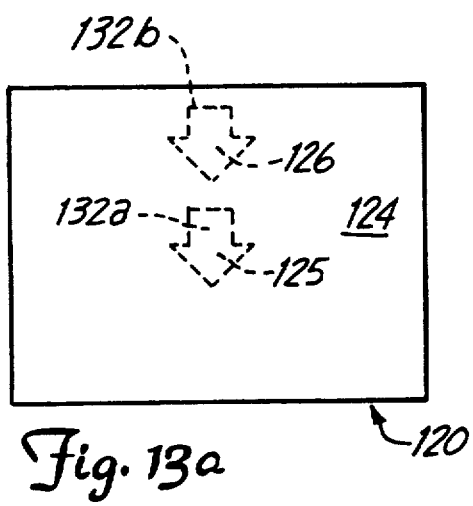
FIGS. 13a, 13b, 13c and 13d are sequential views of a visual display of the present invention employing three reversible thermochromic image layers which are activated at different temperatures.
Figure 13B:
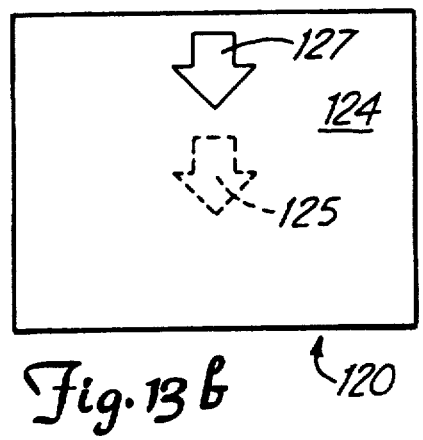
Figure 13C:
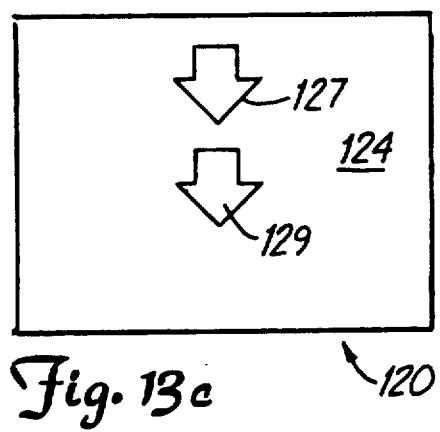
Figure 13D:
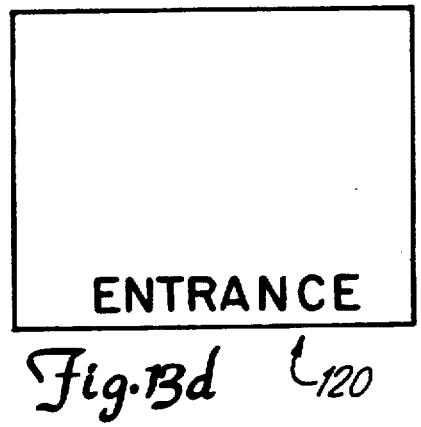

FIG. 13a shows the visible display area of the visible display 120, which has a thermochromic background image layer 124 with image openings 132a and 132b thereon. In this case, the openings 132a and 132b are configured as arrows. A thermochromic image layer 125 comprises a positive representation of an arrow and is positioned in overlapping arrangement with the negative arrow representation (opening 132a) on the thermochromic image layer 124. Similarly, a thermochromic image layer 126 represents a positive arrow and is in overlapping registration with the other negative arrow image (opening 132b) on image layer 124. Contiguous edges of the positive image layers 125 and 126 and the layer 124 overlap slightly (i.e, the positive arrows 125 and 126 are slightly larger than their respectively shaped openings 132a and 132b).

At an ambient temperature range (e.g., below 40° C.), the three thermochromic image layers 124, 125 and 126 all appear as the same opaque color (e.g., black), so the display 120 looks blank (no message). As the display 120 is heated, the thermochromic image layer 126 reaches its transition temperature (e.g., 42° C.) first and changes from a non-light transmissive state to a light transmissive state (colorless). The underlying non-thermochromic image is of a highly contrasting color to the thermochromic layers (e.g., a yellow non-thermochromic) so that a yellow arrow 127 appears (see FIG. 13b). As the temperature continues to rise, the thermochromic image layer 125 then reaches its transition temperature (e.g., 46° C.) and changes from its non-light transmissive state to a light transmissive state (colorless) to provide an image of a second yellow arrow 129 (see FIG. 13c). As the temperature continues to rise, the thermochromic image layer 124 reaches its transition temperature (e.g., 50° C.) and clears so the entire underlying message (e.g., "ENTRANCE") on the non-thermochromic layer is visible. As the thermochromic image layer 124 (background) disappears, the arrows 127 and 129 also disappear, as their outlines defined by the layer 124 disappear. As before, the heater for the display 120 is then ultimately turned off and the cooling of the display 120 causes the images to be displayed in a reverse sequence. The display 120 can be cycled up and down continuously as desired to display the active message, by suitable control of the heater. As can be appreciated, any number of image sequences is possible using the positive/negative relationship set forth herein for a plurality of adjacent thermochromic layers on a visual display apparatus, so long as the transition temperatures of the layers are different.

In order to provide a visual display which is fast and controllable, the substrate is preferably formed from a thin sheet. Suitable materials contemplated for the dielectric substrate include (but are not lined to) polymers or paper. Polymers such as polycarbonate or polyamide are contemplated, as well as heat stabilized polyester which is relatively inexpensive. Because the substrate will be heated and cooled, it is preferable that the substrate have a uniform thickness and be relatively thin (e.g., 2 mil). In this way, heat can move relatively rapidly through the substrate as the heating portion of the imaging cycle is initiated. During the cooling portion of the cycle, the substrate will cool relatively quickly because of its small thermal mass.

Of course, the substrate for the visual display of the present invention is not limited strictly to a sheet—any material that has good receptivity to the necessary inks or dyes and the desired heat conductivity may be used as the substrate. However, in the preferred embodiment, a sheet structure for the substrate is desired. The use of a sheet allows the visual display apparatus to be relatively thin and require as little space as possible. Furthermore, the power requirements to heat a sheet substrate are lower because of its relatively small thermal mass.

The heating structure for the visual display substrate is preferably provided by a vapor deposited thin film heater element mounted to a uniform thickness onto the substrate. Such a vapor deposited thin film heater is available from Flex Products, Inc., of Santa Rosa, Calif., and is identified as an Integrated Buss Bar Heater. This Joulean heater is formed from a thin poorly conductive film which has been vapor deposited to a uniform thickness on the relatively thin substrate sheet, and a pair of opposed highly conductive buss bars spaced apart across the conductive film. For example, FIG. 1 illustrates a heater structure 40 having a thin conductive film 50 of stainless steel which has been vapor deposited onto the substrate 21 and a pair of opposed, copper buss bars 52 and 54 which have been vapor deposited onto the film 50 on the substrate 21. The inside edges of the buss bars 52 and 54 are parallel. Preferably, the conductive film is formed from 302 or 304 stainless steel with a volume resistivity of 85 to $100 \times 10^{-6}$ Ohm cm and with a generally uniform thickness of 200–300 Angstroms to give a sheet resistance of about 60 Ohms per square. The buss bars are preferably formed from copper with a volume resistivity of $1.7 \times 10^{-6}$ Ohm cm and with a generally uniform thickness of approximately 2,000 Angstroms, to provide a buss bar with a resistance of about 0.1 Ohms per square. Other values for the buss bars and conductive film of this heater are possible and available from Flex Products, Inc., and may be desired for different visual display arrangements. For example, by varying the thickness of the conductive film, variations in the conductivity can be attained as desired for heating purposes (e.g., a heater with a sheet resistance of 30 Ohms per square, or 90 Ohms per square, may be desired). The thin conductive film can be formed from any suitable material, but stainless steel is preferred. For example, nichrome, tinoxide, or other materials would work.

By providing a vapor deposited thin film heater, the two-dimensional resistivity of the heater is quite precisely and uniformly controllable. The vapor deposited thin film heater with parallel buss bars thus provides a means for uniformly applying heat to the thermochromic image layers of the visual display of the present invention. The use of vapor deposited buss bars provides an inexpensive and very accurate means for uniformly distributing current applied to the buss bars 52 and 54 over the conductive film 50. However, another type of heater structure (e.g., wire or infrared) will work with the visual display of the present invention, as long as relatively uniform heating of the substrate is achieved.

The copper buss bars can be vapor deposited on the substrate in the same vapor deposition processing run as the conductive film, down line from the vapor depositing of the conductive film on the substrate 21. It is also contemplated that the buss bars be printed on the vapor deposited conductive film 50 on substrate 21, rather than applied by vapor deposition techniques. For example, conductive silver ink can be applied (e.g., silk-screened) to the film 50 on the substrate 21 to provide opposed buss bars such as those illustrated in FIG. 1, but silver ink is much more expensive than copper and requires a separate processing step (printing) for the substrate 21.

The visual display employs a thin film structure so relatively rapid heating and cooling of the apparatus are possible. In addition, the display is subject to ambient environmental conditions such as room temperature variations, convection currents, etc. In order to operate a visual display such that the image sequence is portrayed in the desired manner, it has been found to be useful to control the environment of the display itself. This lessens the effects on the display of ambient temperature changes or convection air currents.

The rate of heating of the display is dependent upon the power density of the heater and its thermal mass. The thermal mass is dependent upon the heat capacity of the display itself—a composite structure of several material layers including the substrate, the thin film heater element and the various non-thermochromic and thermochromic image layers. The thinner the display structure, the faster the heating and response time. For a display with quick thermal response times, the thinnest possible display is required.

Limiting the wattage density of the display to no more than 100 watts per square foot limits the maximum temperature that the display can obtain with the heater switched on continuously to about 65°–70° C. (see, e.g., line 150 in FIG. 9 which represents the heater performance if simply left "on"). This equilibrium temperature occurs when the heat loss equals the heating power. Thus, having a safe upper limit equilibrium temperature (no more than 70° C.) limits the power density of the display. A very thin display is required for fast response times.

The cooling response curve of the display is dependent upon the thermal mass of the display and the thermal insulation in front of and behind the display. As mentioned, the display, if freely suspended in the air, will cool dependent upon the thermal film coefficients resulting from the natural convection of the air flowing up and down both sides of the display. These convection air currents tend to cool the bottom of the display before the top of display. In some cases, the change of the display images from bottom to top is desired. In other cases, however, a uniform picture change is desired.

In some applications, it may be acceptable for the display to be freely suspended in the open air. However, to provide for a more uniform picture change during both the heating and cooling periods, it may be desirable to eliminate large convection air currents. In addition, it may be useful to provide a uniform thermal heat sink for the display to prevent a non-uniform temperature profile, which will cause a visual patterning effect. Too much insulation increases the cooling time period of the display while not enough insulation requires increasing the power density of the heater or increasing the heating period required by the highest temperature thermochromic ink layer (layer 24 in FIGS. 1, 3 and 4a). Therefore, a match must be made between the power density and the amount of thermal insulation for the display to allow for both good response speed and minimum energy requirements.

FIG. 14 illustrates an environmental enclosure 170 for the visual display apparatus of the present invention. This enclosure 170, shown in section in FIG. 15, provides the necessary balance for the characteristics of high speed response of the visual display apparatus, low energy requirements and an adjustable heat dissipation period. In addition, the enclosure provides the aesthetically pleasing effect of framing the display for viewing.

Enclosure 170 is formed from a back plate 172 and front plate 174, with a peripheral edge wall 176 joining the back plate 172 and front plate 174 together (parallel) around their edges. The visual display 20 is suspended from at least one of the edge walls 176 between the front plate 174 and back plate 172. Spacers or supports 178 are provided to hold the visual display 20 and space it between the plates 172 and 174. The front plate 174 is transparent, formed either from glass or from a polymer material to allow viewing of the visual display 20. The display 20 is thus fully contained within an environmentally controllable chamber 179 defined within the enclosure 170 and thereby substantially segregated from the effects of ambient environmental conditions.

In a typical application, the visual display of the present invention will be oriented in a generally vertical plane, with a top edge 20a above a bottom edge 20b (see FIG. 15). An air gap 180 is provided between the front transparent plate 174 and the visual display 20, while a back air gap 182 is provided between the visual display 20 and the back plate 172. Preferably, the air gaps equal approximately 0.125 inch to 0.25 inch. Such gaps greatly reduce convection air currents alongside the display 20 and promote uniform heating and cooling of the display 20. Thus, a uniformly changing display is attained both vertically and horizontally. An aperture screen 184 is provided to restrict or block out the viewing of that portion of the display which may be locally cooled by contact with the spacer 178 or edge wall 176 used to suspend or hold the display 20 in the enclosure 170.

A typical visual display of the present invention (e g., 10 inches by 12 inches) maintains a uniform temperature from side to side and top to bottom, having a difference of less than 1° C. To further aid the uniform heating aspects of the structure, the back plate 172 is provided with a uniform thermal heat sink. Such a heat sink allows the back plate to have high thermal conductivity both vertically and horizontally, thereby reducing the effect of higher temperatures occurring at the top of a vertically oriented display. To achieve this end, the back plate 172 may be formed from a sheet of metallic foil (such as aluminum) or may be coated with a sheet of such foil either by itself or with an insulator (e.g., a rigid foam sheet or cardboard). To further provide a thermal heat sink for the display, the thermally conductive back plate 172 (e.g., aluminum sheet or the like) may be thermally connected to a conductive frame surrounding the display. Such a frame can be formed from a metallic molding such as aluminum and may constitute the peripheral edge walls 176, as seen in FIG. 15.

In some instances, a non-uniform heating of the display may be preferred. For example, it may be desired to cause a thermochromic image to change from one side of the display to another, rather than uniformly. One means for changing the heating gradient of the display is to modify the buss bar arrangement. For example, in a vertically aligned display where the thermochromic image clears from bottom to top as the display temperature is raised, the buss bars (along the sides of the display) can be aligned so that their inside edges are not parallel (i.e., with their bottoms closer).

FIG. 16 illustrates a heater structure 190 of this type. Buss bars 192 and 194 have non-parallel inside edges (closer at the bottom as viewed in FIG. 16), so the power density across a conductive film 195 is increased adjacent the bottom edge and thus a greater heating rate takes place towards the bottom of the heater structure 190. The temperature rise upward is indicated by arrows 196. A 2°-3° C. temperature gradient during a typical heating period (e.g., 60 seconds) is possible with such an arrangement, depending, of course, on the size of the display, spacing of buss bars, power applied, etc.

FIG. 17 illustrates an alternative heater structure 200 wherein a similar heating pattern can be achieved. Buss bars 202 and 204 have parallel inside edges, but one of the buss bars (buss bar 202) is shorter than the other buss bar (buss bar 204). Accordingly, when current is applied to the buss bars 202 and 204, the power density across a conductive film 205 therebetween is increased adjacent the shorter buss bar 202 and thus a greater heating rate takes place towards the bottom of the heater structure 200. The temperature rise moves upward as indicated by arrows 206. Of course, this arrangement may be rotated 90 degrees with respect to the images thereon, so that the temperature rise moves from left-to-right or right-to-left. This arrangement may also be reversed, so that the temperature rise moves downward across the display. As can be appreciated, the alignment of the buss bars dictate the temperature change pattern of the heater, and numerous effects and patterns beyond those described and illustrated herein are possible.

Figure 18:
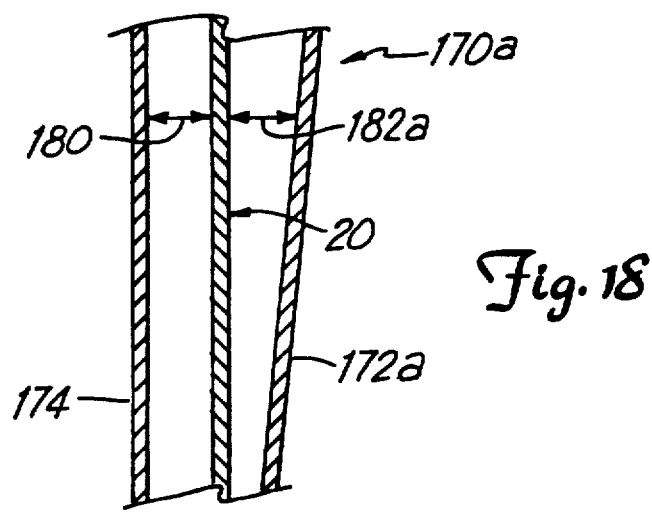
FIG. 18 is a partial cross-sectional view illustrating an alternative embodiment of the enclosure for a visual display.

Another means to achieve non-uniform cooling of the display during the cooling portion of a heating cycle is to provide an enclosure arrangement with less insulation at one side (e.g., the bottom) of the display. A number of ways to achieve this end are possible, although a simple and effective way is by varying the air gap between the display and its enclosure. As seen in FIG. 18, a rear air gap 182a between the display 20 and a rear plate 172a of an enclosure 170a is larger at the top of the display than at the bottom of the display (e.g., the gap at the top of the display is 0.25 in. while the gap at the bottom of the display is 0.0625 in., for a 12-inch high display). The insulating effect of the air gap 182a is proportional to the thickness of the air gap. Therefore, for a smaller air gap, heat will be conducted away faster from the cooling display 20 than for the larger air gap. The gap is not large enough to actually allow convection currents to be generated. This type of tapered air gap can create a 2°-5° C. temperature gradient vertically across a typical 12-inch display. In FIG. 18, the front gap 180 is shown as a uniform gap between the front plate 174 and the display 20. The front gap 180 can also be varied as desired to achieve a particular cooling gradient control for the display 20.

In one embodiment, the enclosure is formed so that its back plate may be removed and the display therein changed. Such a modular enclosure is illustrated schematically in FIG. 19. Enclosure 270 has a transparent front plate portion 274 and a removable back plate 272. Peripheral edge walls 276 join the front and back plates 274 and 272 together when assembled. The back plate 272 is attached to the enclosure 270 by suitable releasable fastener means. When assembled, the enclosure 270 defines a chamber 279 therein for a replaceable display 220.

The display 220 is formed as described above with a uniform heater structure 340 thereon, which has opposed buss bars 352 and 354 extending across a heater element 350. The display 220 is releasable supported within the chamber 279 of the enclosure 270 by suitable engagement means such as threaded members, frictional engagement clamps or the like. By way of illustration, the engagement means is shown as a pair of contact posts 360 and 362 secured within the enclosure 270 along its top portion, while a pair of support posts 364 and 366 are mounted therein along its bottom portion. The display 220 has a pair of corresponding contact tabs 361 and 363 along its top portion which are adapted to conductively engage and be secured to the contact posts 360 and 362, respectively. Similarly, a pair of mounting loops 365 and 367 are mounted on the display 220 adjacent its bottom portion for securement to corresponding mounting posts 364 and 366 of the enclosure 270. By mounting the display 220 to the enclosure 270 in this manner, the display is stretched taut and generally flat to maintain the desired thermal spacing between the display, front plate 274 and back plate 272, once the back plate 272 is reassembled onto the edge walls 276 of the enclosure 270.

Figure 19:
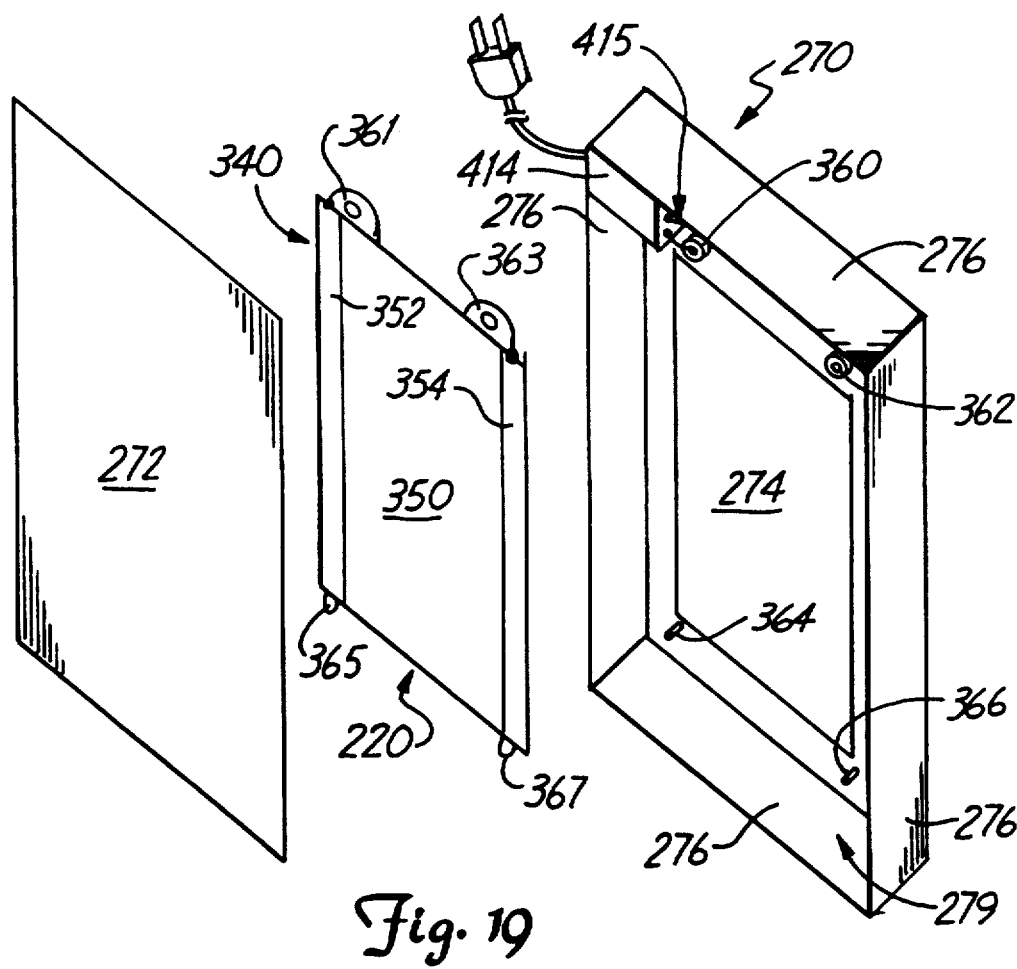
FIG. 19 is an exploded diagrammatic perspective view of a modular enclosure for the visual display of the present invention.

With the modular arrangement illustrated in FIG. 19, the display 220 itself can be easily changed within the more permanent and reusable enclosure 270 to provide different images or messages to a viewer. The display can be varied monthly, seasonally or to highlight or announce some special activity (e.g., a sale). The previously described features for such a display and enclosure can similarly be incorporated into this modular enclosure for a display (e.g., thermally conductive back plate, conductive frame, buss bar alignment, etc.).

In order to operate the visual display of the present invention, the heater is selectively activated by the application of electrical current thereto. As discussed above, a preferred heater structure is a thin conductive film which is uniform in thickness so that as current is applied thereto, the film heats uniformly. This uniform heating is further aided by employing parallel opposed highly conductive buss bars which act as leads for current application to the heater structure. In FIG. 1, the heater structure 40 is shown with electrical leads 380 and 382 conductively mounted to buss bars 52 and 54, respectively. These electrical leads are connected to a suitable control circuit and power source for supplying electrical current to the heater structure 40 as desired.

Figure 20:
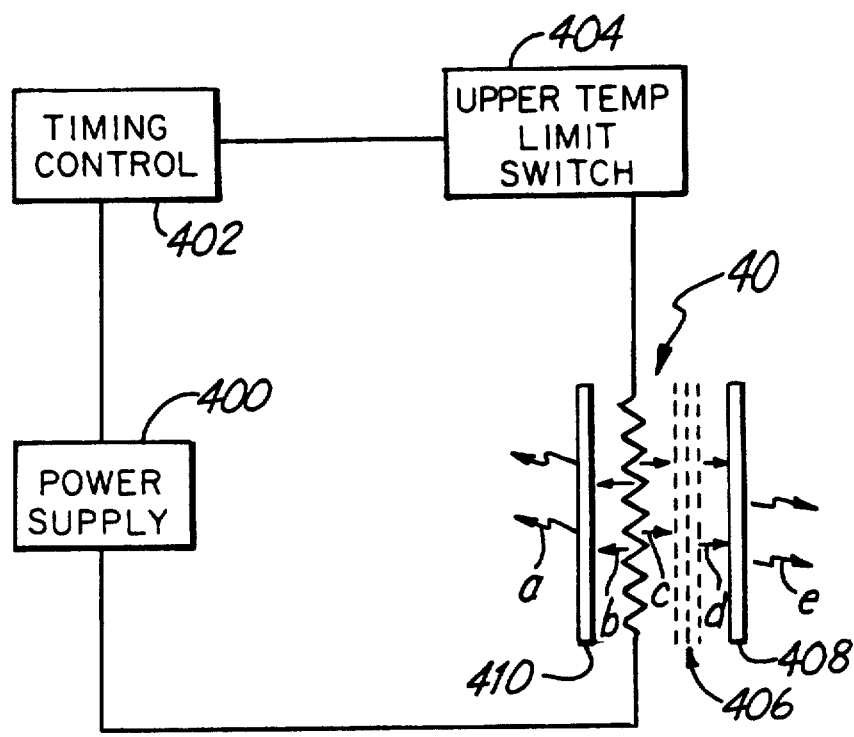
FIG. 20 is a diagrammatic circuit diagram for the heater of the visual display of the present invention.

A typical control circuit for the heater structure 40 of the present invention is illustrated schematically in FIG. 20. A power supply 400 supplies current to the heater structure 40 via a timing control 402. Also provided in this circuit is an upper temperature limit switch 404.

To sequence the different images in a visual display apparatus of the present invention, the electrical power to the heater 40 must be periodically turned on and off to vary the temperature of the display, thus activating the transition temperatures of the different thermochromic materials thereon. In FIG. 20, the thermochromic materials are illustrated schematically as at 406, the front transparent cover of a suitable enclosure is indicated as at 408, and a back cover for such an enclosure is indicated as at 410. The heat conduction/convection paths caused by activation of the heater 40 are illustrated in FIG. 20 by arrows a, b, c, d and e. Arrows b and c indicate the heat paths to the rear cover 410 and thermochromic materials 406, respectively. Arrow d represents the heat path from the thermochromic materials to the front cover 408. Arrows a and e represent the heat paths from the heater 40 which are passed on to the surrounding environment for the display apparatus of the present invention.

The power supply 400 can be simple house current (120 volts AC), or any suitable power supply (AC or DC) which provides sufficient current to activate the heater as desired. The timing control 402 can be any suitable means for switching the current on and off over time to the heater 40. This can be a simple timing arrangement such as an electronic flashing circuit (square wave generator) or a more complex system based upon temperature sensing of the heater or the enclosure. A microprocessor may be used for controlling the application of current to the display and hence its temperature. The use of a square wave generator is quite simple, and the timing control in that case simply turns on and off the heater by means of a mechanical switch (relay) or a solid state switch. The on/off time periods for the circuit are established dependent upon the particular image display being controlled. A duty cycle showing equal on/off periods for heater activation for the heater is illustrated in FIG. 9. The on/off times established by the timing control 402 are long enough to assure that the visual display apparatus has heated and cooled enough so that it sequences through all of its active images (the heat and cool periods in each cycle may be of different lengths).

Because the ambient temperatures can change within a single room by as much as 5°-8° C., the dwell times at the top and bottom of the duty cycle for the timing control 402 may be adjusted to build in extra heating time or cooling time to accommodate room temperature changes. For example, the heater "on" time may be maintained for 5-10 seconds after the highest transition temperature is reached to make certain that the display apparatus has fully sequenced through its images. Similarly, the heater "off" time may be extended by 5-10 seconds to make certain that the cooling cycle has been completed.

This may be accomplished by simply providing a thermal switch for heater activation that has a thermal hysteresis of large enough time delay to allow the display to cycle over its complete temperature operating range.

The upper temperature limit switch 404 is provided as an override switch to cut power to the heater if a certain high temperature is reached. The upper temperature limit switch 404 has temperature sensing means such as a bimetallic switch which monitors the temperature of the heater or enclosure chamber for this purpose. The bimetallic switch thus automatically resets after the heater has cooled down so that the circuit may be reused, or the switch 404 may be a one shot thermal and/or current fuse.

This type of control circuit is quite simple, reliable and effective in controlling operation of the heating element for the visual display of the present invention. It can also be configured quite compactly for mounting within the enclosure for the display. For example, such a circuit can be located in a small area within the chamber 279 of the enclosure 270 of FIG. 19, as indicated by control box 414. As illustrated in FIG. 19, current leads 415 from the control box 414 extend to the conductive posts 360 and 362 to provide current thereto, which is then passed on to the display 220 via conductive tabs 361 and 363 which are in turn electrically coupled to the buss bars 352 and 354.

In addition to the circuit which controls the operation of the thermochromics on the display, a switch may be provided for externally controlled activation and deactivation of the circuit itself. Thus, instead of the circuit constantly cycling the display through its operating temperature range, the circuit may not even be activated until some specific event occurs. For example, the circuit is activated to follow its heating/cooling cycle by a simple switch which detects the opening of a door, or by an infrared sensor which detects the presence of a viewer in front of the display. Conversely, when the door is reclosed or the sensor no longer detects the presence of a viewer by the display, the circuit is deactivated to stop its cycling.

Figure 21:
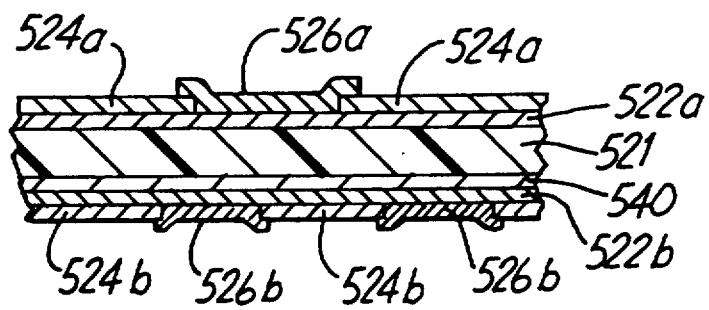
FIG. 21 is a partial cross-sectional view of an alternative embodiment of the visual display of the present invention, where a thermochromic imaging display is placed on both sides of the substrate.
Figure 22:
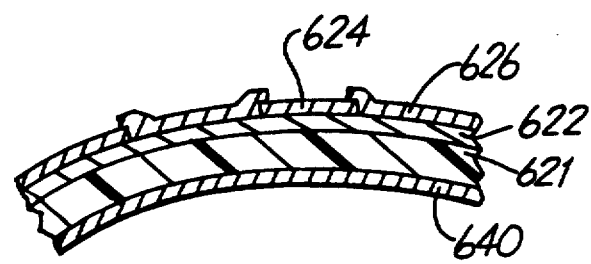
FIG. 22 is a partial cross-sectional view of a non-planar embodiment of the visual display of the present invention.

Further alternative structures for the display apparatus of the present invention are seen in FIGS. 21 and 22. A single substrate can bear image layers on both sides thereof for two-sided viewing. FIG. 21 illustrates a substrate 521 with a heating element 540 on one side thereof. On that same side, there is a non-thermochromic image layer 522a with reversible thermochromic layers 524a and 526a placed over the non-thermochromic image layer 522a. On the other side of the substrate (the same side as the heating element 540), there is a non-thermochromic layer 522b over the heating element 540 with reversible thermochromic layers 524b and 526b placed over the non-thermochromic layer 522b. Accordingly, a relatively thin two-sided visual display is created, wherein the visual displays on each side of the substrate 521 may be entirely different, with wavelength transmission state changes occurring at different temperatures based upon the thermochromic materials on each side. Such a display is suitable for positioning in a window of a store, to provide an active image on both sides thereof, or it can be mounted in an enclosure which is transparent on both its front and back panels for viewing from two sides.

It is not necessary that the substrate and visual display apparatus formed thereon be planar. FIG. 22 illustrates a curved substrate 621 having a heating element 640 on one side thereof. The non-thermochromic image layer 622 and overlying thermochromic image layer 624 and 626 mounted on the substrate 621 are similarly curved.

EXAMPLE

A further illustration of the present invention is provided by way of the following example. An 8½×11 inch sheet of paper 0.004 inches thick was provided with a color picture of Coca-Cola® beverage products thereon. A vapor deposited stainless steel heater having a sheet resistivity of 60 Ohms per square is also provided. The stainless steel is born by a 10×11 inch polyester sheet having a thickness of 0.001 inch, and has opposed copper buss bars thereon, each with a resistivity of 0.1 Ohms per square. The buss bars along its longer length, each buss bar being ⅜ of an inch wide. The exposed stainless steel heater is thus approximately 8½×11 inches. This heater structure is laminated to the back side of the paper sheet, with the vapor deposited heater components facing the sheet to make better contact therewith and protect the heater surface from possible scratches. This lamination is achieved by means of a pressure sensitive adhesive having a thickness of 0.001 inches.

A 47° C. thermochromic ink from Matsui Shikiso Chemical Co., Ltd. was UV silkscreened over the color picture, using 110 square per inch mesh monofilament. The 47° C. thermochromic material formed a negative representation of the words "The Real Thing" and at temperature below 47° C., the thermochromic material looked black. A 45° thermochromic ink material from Matsui Shikiso Chemical Co., Ltd. was then UV silkscreened over the picture in the form of a positive image of the words "The Real Thing", with a slight registration overlap over the negative image of the 47° thermochromic, so that none of the picture was visible. At temperatures below 45° C., the positive image thermochromic material also appeared black. A 39° C. liquid crystal material from Hallcrest was then also silkscreened over the 47° and 45° thermochromic materials using a 110 square per inch mesh as a positive representation of the words "Coca-Cola." The thickness of the inks and liquid crystal on the paper amount to no more than 0.005 inches.

A transparent polyester top layer of 0.002 inches thickness was laminated over the top of the thermochromic materials to also protect those materials from abrasion, and to provide a shiny surface for the display. This lamination is again achieved using a pressure sensitivity adhesive which is 0.001 inches thick. Accordingly, the total thickness of the display structure including its substrate, vapor deposited heater, non-thermochromic paper image layer, thermochromic images layers and top protective coating is 0.0115 inches.

In this example, two such displays are connected in series, with a top buss bar of a lower display conductively connected to a bottom buss bar of a top identical display. Household current applied to the joined displays through the free buss bars of the two displays results in an active display system which has an image cycle time of 70 seconds. The current is applied for 35 seconds to elevate the temperature of the display, thereby activating the liquid crystal to be optically visible and show the words "Coca Cola" and then turn colorless, clear the 45° thermochromic ink to show the words "The Real Thing" and then clear the 47° thermochromic ink to fully show the picture of Coca Cola products. The heater is then turned off for 35 seconds to reverse the sequence, bringing the display back to a blank black image.

The image display arrangement of the present invention is quite versatile in providing a display structure with an active visual display by means of controlled heating of the structure itself and control of a defined environment for the structure. The present invention is elegantly simple in operation and design. It provides high quality visual images in an efficient manner, within a relatively small space and with very low power requirements, in order to obtain a highly attractive and eye-catching visual display.

Although the present invention has been described with reference to preferred embodiments, workers skilled in the art will recognize that changes may be made in form and detail without departing from the spirit and scope of the invention.

What is claimed is:

1. A visual display apparatus comprising:
   a substrate having a visible display area;
   means for controlling the temperature of the visible display area of the substrate;
   a first thermochromic material covering a first portion of the visible display area, the first thermochromic material changing, as a result of a first temperature change, from a first colored state to a second generally transparent state; and
   a second thermochromic material covering a second portion of the visible display area, the second thermochromic material changing as a result of a second temperature change, from a first colored state to a second generally transparent state,
   wherein the first and second thermochromic materials combine to form a substantially single thermochromic layer on the visible display area of the substrate,
   wherein one of the first and second portions defines, at least in part, a positive representation of a desired display image and the other one of the first and second portions defines, at least in part, a negative representation of the same desired display image at the same place on the visible display area, and
   wherein the first and second thermochromic materials have the same color when in their respective first colored states.

2. The apparatus of claim 1 wherein the temperature varying means comprises:
   a vapor deposited heater element on the visible display area of the substrate.

3. The apparatus of claim 2, wherein the temperature controlling means further comprises:
   means for applying an electrical current to the heater element.

4. The apparatus of claim 3 wherein the current applying means includes a pair of spaced apart, highly conductive buss bars mounted on the heater element for uniformly distributing the current to the heater element on the visible display area of the substrate.

5. The application of claim 1 wherein the substrate is a thin sheet.

6. The apparatus of claim 1 wherein the first and second temperature changes are defined by sequential increases in the temperature of the visual display area of the substrate.

7. The apparatus of claim 1, and further comprising:
a non-thermochromic image layer aligned within the image display area between the substrate and the first and second thermochromic materials.

8. The apparatus of claim 1, and further comprising:
a non-thermochromic image layer aligned within the image display area and over at least one of the thermochromic materials to cover a portion of the visible display area.

9. The apparatus of claim 1, and further comprising:
a thermally activated material mounted over at least a portion of either the first portion or second portion of the visible display area, with the thermally activated material becoming optically active over the visible range only within a desired temperature range.

10. The apparatus of claim 9 wherein the thermochromic materials are generally dark when in their respective first colored states, and wherein the thermally active material is a liquid crystal.

11. The apparatus of claim 9 wherein the first and second temperature changes are defined by sequential increases in temperature, and wherein the desired temperature range has its highest temperature point spaced below the first temperature change.

12. The apparatus of claim 1 wherein the temperature controlling means includes a control system for reversibly changing the temperature of the visible display area of the substrate from a base temperature below the first temperature change up to a maximum temperature above the second temperature change.

13. The apparatus of claim 1 wherein the thermochromic materials comprise thermochromic inks.

14. The apparatus of claim 1, and further comprising:
a third thermochromic material covering a third portion of the visible display area, the third thermochromic material changing, as a result of a third temperature change, from a first colored state to a second generally transparent state, with the third temperature change occurring between the first and second temperature changes as the temperature of the visual display area of the substrate is changed,
wherein the first, second and third thermochromic materials combine to form a substantially single thermochromic layer on the visible display area of the substrate,
wherein the third portion defines either a positive or negative representation of a desired display image and the second portion defines an opposite representation of the same desired display image at the same place on the visible display area, and
wherein the first, second and third thermochromic materials have essentially the same visual densities when in their respective first colored states.

15. The apparatus of claim 14 wherein the second and third thermochromic materials overlap slightly along contiguous edges thereof.

16. The apparatus of claim 1 wherein the first and second thermochromic materials overlap slightly along contiguous edges thereof.

17. The apparatus of claim 16 wherein the first and second thermochromic materials overlap by no more than 0.020 inch.

18. A visual display apparatus comprising:
a substrate having a visible display area;
means for controlling the temperature of the visible display area of the substrate;
a first thermochromic material covering a first portion of the visible display area, the first thermochromic material changing, as a result of a first temperature change, from a first colored state to a second generally transparent state; and
a second thermochromic material covering a second portion of the visible display area, the second thermochromic material changing as a result of a second temperature change, from a first colored state to a second generally transparent state,
wherein the first and second thermochromic materials combine to form a substantially single thermochromic layer on the visible display area of the substrate,
wherein one of the first and second portions defines, at least in part, a positive representation of a desired display image and the other one of the first and second portions defines, at least in part, a negative representation of the same desired display image at the same place on the visible display area, and
wherein the first and second thermochromic materials both have the same general opaque visual density when in their respective first wavelength transmission states and both are generally colorless when in their respective second wavelength transmission states.

19. The apparatus of claim 18 wherein the first and second temperature changes are defined by sequential increases in the temperature of the visual display area of the substrate.

20. The apparatus of claim 18 wherein the temperature controlling means includes a control system for reversibly changing the temperature of the visible display area of the substrate from a base temperature below the first temperature change up to a maximum temperature above the second temperature change.

21. The apparatus of claim 18 wherein the thermochromic materials comprise thermochromic inks.

22. The apparatus of claim 18 wherein the first and second thermochromic materials overlap slightly along contiguous edges thereof.

23. The visual display apparatus of claim 18 wherein the substrate is a thin sheet, and further comprising:
enclosure means about the sheet for protecting the sheet and for reducing environmental interference with a desired thermal operation of the display apparatus.

* * * * *

UNITED STATES PATENT AND TRADEMARK OFFICE
CERTIFICATE OF CORRECTION

PATENT NO. : 5,202,677
DATED : April 13, 1993
INVENTOR(S) : ROBERT PARKER, STEPHEN PHILLIPS It is certified that error appears in the above-identified patent and that said Letters Patent is hereby corrected as shown below:

On the Title Page of the Patent, in the [56] References Cited Section, under U.S. PATENT DOCUMENTS, insert the following:

| | | | |
|---|---|---|---|
| 4,006,414 | 2/1977  | Parker           | 324/96  |
| 4,028,118 | 6/1977  | Nakasuji et al   | 106/21  |
| 4,554,565 | 11/1985 | Kito et al       | 346/201 |
| 4,560,604 | 12/1985 | Shimizu et al    | 428/87  |
| 4,702,564 | 10/1987 | Parker           | 350/351 |
| 4,717,710 | 1/1988  | Shimizu et al    | 583/213 |
| 4,720,301 | 1/1988  | Kito et al       | 106/21  |
| 4,835,476 | 5/1989  | Kurosawa         | 324/435 |
| 4,851,282 | 6/1989  | Shimizu et al    | 428/283 |
| 4,917,643 | 3/1990  | Hippely et al    | 446/14  |
| 4,920,991 | 5/1990  | Shibahashi et al | 132/73  |
| 4,922,242 | 5/1990  | Parker           | 340/786 |
| 4,971,068 | 11/1990 | Sahi             | 128/763 |

Signed and Sealed this

Thirtieth Day of November, 1993

Attest:

BRUCE LEHMAN

*Attesting Officer*  *Commissioner of Patents and Trademarks*